US012706673B2

(12) United States Patent
Kim et al.

(10) Patent No.: US 12,706,673 B2
(45) Date of Patent: Aug. 11, 2026

(54) METHOD AND APPARATUS FOR ESTIMATING OPTIMAL OPTICAL SIGNAL TRANSMISSION POWER FOR TRANSMISSION NETWORK EQUIPMENT

(71) Applicant: KT CORPORATION, Gyeonggi-do (KR)

(72) Inventors: Eun-Do Kim, Gyeonggi-do (KR); Kwang-Koog Lee, Gyeonggi-do (KR); Gwang-Hyen Jo, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 331 days.

(21) Appl. No.: 18/377,924

(22) Filed: Oct. 9, 2023

(65) Prior Publication Data

US 2024/0120997 A1 Apr. 11, 2024

(30) Foreign Application Priority Data

Oct. 7, 2022 (KR) ........................ 10-2022-0128603

(51) Int. Cl.
*H04B 10/079* (2013.01)

(52) U.S. Cl.
CPC .............................. *H04B 10/07955* (2013.01)

(58) Field of Classification Search
CPC .......... H04B 10/07955; H04B 10/0791; H04B 10/0793; H04B 10/0795; H04B 10/0775; H04B 10/07953; H04B 10/564; G06N 20/00
See application file for complete search history.

(56) References Cited

U.S. PATENT DOCUMENTS

| | | | | |
|---|---|---|---|---|
| 10,938,484 | B2 * | 3/2021 | Jiang | H04B 10/6163 |
| 2007/0139774 | A1 * | 6/2007 | Ohtani | H04B 10/0775 359/515 |
| 2021/0013963 | A1 * | 1/2021 | Kuwabara | H04B 10/0791 |
| 2022/0303021 | A1 * | 9/2022 | Nomura | H04B 10/6165 |
| 2024/0372600 | A1 * | 11/2024 | Schreck | H04B 7/06952 |
| 2025/0105917 | A1 * | 3/2025 | Sasai | H04B 10/073 |
| 2025/0141546 | A1 * | 5/2025 | Anazawa | H04B 10/07953 |

FOREIGN PATENT DOCUMENTS

| | | | | |
|---|---|---|---|---|
| CN | 111786724 | B * | 7/2021 | G06N 3/08 |
| JP | 2019-140666 | A | 8/2019 | |
| KR | 10-0353615 | B1 | 9/2002 | |
| KR | 10-2009-0032745 | A | 4/2009 | |
| KR | 10-2011-0103550 | A | 9/2011 | |
| KR | 10-1452649 | B1 | 10/2014 | |
| KR | 10-2430094 | B1 | 8/2022 | |

* cited by examiner

*Primary Examiner* — Hibret A Woldekidan
(74) *Attorney, Agent, or Firm* — IP Legal Services, LLC

(57) ABSTRACT

Provided are a method and apparatus for estimating an optimal optical signal transmission power. The method may include: generating an estimation data including an estimated optical signal transmission power and transmission network facility information; inputting the estimation data into a pre-trained model; calculating an optical signal reception power based on the estimation data; and estimating an optimal optical signal transmission power based on the calculated optical signal reception power.

15 Claims, 3 Drawing Sheets

METHOD AND APPARATUS FOR ESTIMATING OPTIMAL OPTICAL SIGNAL TRANSMISSION POWER FOR TRANSMISSION NETWORK EQUIPMENT

BACKGROUND

The present disclosure relates to a method and apparatus for estimating an optimal optical signal transmission power for transmission network equipment and controlling transmission network equipment based on the estimated optimal optical signal transmission power.

The need for energy conservation is becoming increasingly important due to the expansion of ESG management for the sustainable growth of companies. In this context, ESG refers to the combination of non-financial factors of a company: Environmental, Social, and Governance. ESG management is the pursuit of sustainable growth through environmentally friendly and transparent social responsibility management from a long-term perspective.

However, transmission network equipment outputs excessive optical signal power from the transmitter, regardless of environmental conditions.

Repeaters are operated to compensate for the natural attenuation of optical signal power due to the distance between transmitter and receiver. Transmission network equipment needs to be able to move large-scale network traffic over long distances. The power of the optical signal gradually decreases naturally as it travels through the optical cable. To overcome this, repeaters are installed at intervals to amplify the optical signal power during transmission.

In terms of the appropriate optical signal power for transmission and reception, it is generally possible to recover the signal through amplification if it can be received at −18 dBm or higher. If too weak an optical signal is received, amplification will result in distortion, making recovery impossible. On the other hand, if too strong an optical signal is received, an appropriate attenuator can be connected at the receiver to reduce the power to a certain level. Generally, the suitable optical signal power for reception is defined and operated to be between −18 to −8 dB.

One problem is the difficulty in predicting the natural attenuation of optical signal power between a transmitter and a receiver. Complex factors affecting the natural attenuation of optical signal power exist, such as the length of the optical cable (including slack), the number of patch sections, the power of the transmitted optical signal and the type of equipment. The current operation method involves outputting maximum power from the transmitter and connecting an attenuator at the received as needed.

SUMMARY

In accordance with an aspect of the present embodiment, a method and apparatus for estimating an optimal optical signal transmission power for transmission network equipment and controlling transmission network equipment based on the estimated optimal optical signal transmission power.

In accordance with another aspect of the present embodiment, considering environment conditions, excessive optical signal power is prevented from outputting from the transmitter.

In accordance with an embodiment, an apparatus may be provided for estimating optical signal transmission power for transmission network equipment. The apparatus may include a memory configured to store data received from other entities or generated for estimating an optimal optical signal transmission power; a communication circuit configured to: communicate with other entities through a communication network; a processor configured to generate an estimation data including an estimated optical signal transmission power and transmission network facility information, input the estimation data into a pre-trained model, calculate an optical signal reception power based on the estimation data, and estimate an optimal optical signal transmission power based on the calculated optical signal reception power.

The processor may determine the estimated optical signal transmission power as the optimal optical signal transmission power in an event that the calculated optical signal reception power satisfies a predetermined value.

The processor may modify the estimation data in an event that the calculated optical signal reception power does not satisfy the predetermined value, inputs the modified estimation data into the pre-trained model, and recalculate an optical signal reception power.

The pre-trained model may be a deep learning model with one or more hidden layers.

The processor may generate at least one train data set for optical signal transmission power and optical signal reception power based on at least one feature value and label value and train the pre-trained model using the generated at least one train data set.

The feature vectors may include optical signal transmission power, optical cable length, number of patch sections, number of attenuators, and equipment type.

The label value may include optical signal reception power and optical signal transmission power.

In accordance with another embodiment, a method may be provided for estimating optical signal transmission power. The method may include generating an estimation data including an estimated optical signal transmission power and transmission network facility information; inputting the estimation data into a pre-trained model; calculating an optical signal reception power based on the estimation data; and estimating an optimal optical signal transmission power based on the calculated optical signal reception power.

In accordance with still another embodiment, a non-transitory computer-readable medium may be provided for storing computer-readable instructions such that, when executed, cause a process of a computer to perform a method of estimating an optimal optical signal transmission power. The method may include generating an estimation data including an estimated optical signal transmission power and transmission network facility information; inputting the estimation data into a pre-trained model; calculating an optical signal reception power based on the estimation data; and estimating an optimal optical signal transmission power based on the calculated optical signal reception power.

DETAILED DESCRIPTION OF EMBODIMENTS

Hereinafter, a method and apparatus for estimating an optimal optical signal transmission power for transmission network equipment and controlling the transmission network equipment based on the estimated optimal optical signal transmission power in accordance with an embodiment will be described with reference to the accompanying drawings.

Figure 1:
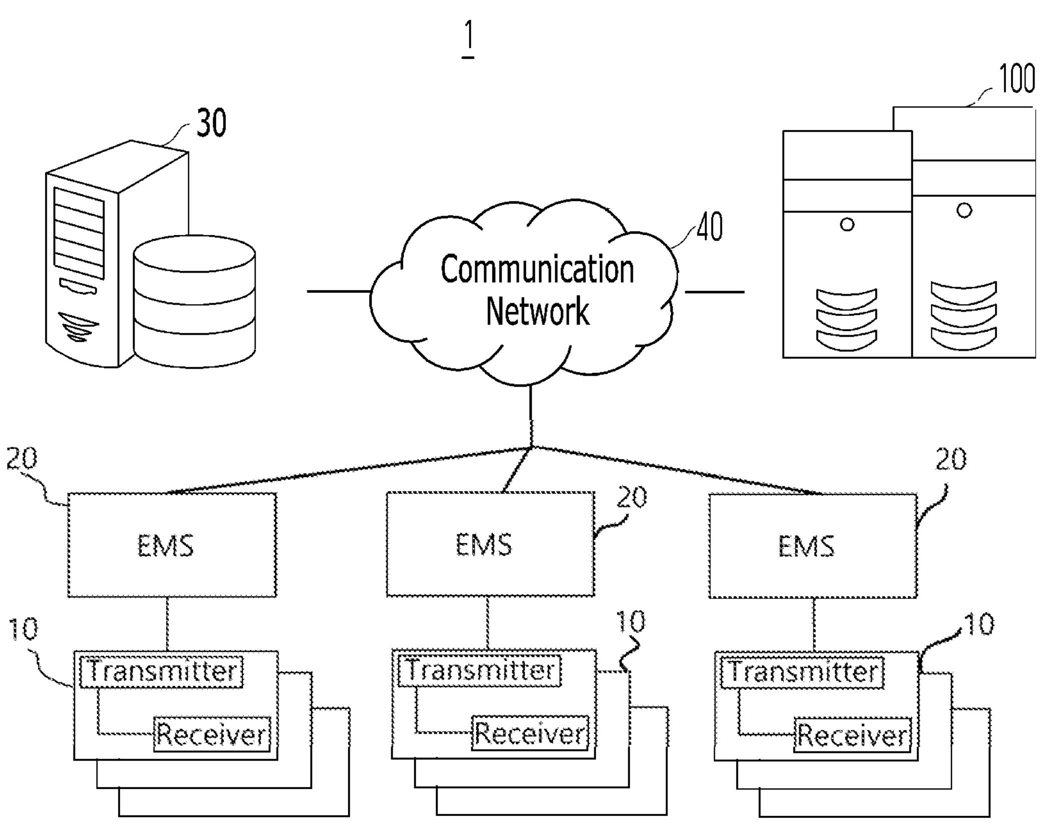
FIG. 1 is a diagram illustrating a system for outputting signal power in accordance with an embodiment.

FIG. 1 illustrating a system for estimating an optimal optical signal transmission power and controlling the transmission network equipment based on the estimated optimal optical signal transmission power in accordance with an embodiment.

Referring to FIG. 1, system 1 may include transmission network equipment 10 each including a transmitter and a receiver, dedicated element management system (EMS) 20, transmission network facility database (DB) 30, and signal power estimation apparatus 100 in accordance with an embodiment. Transmission network equipment 10, dedicated EMS 20, transmission network facility DB 30, and signal power estimation apparatus 100 are illustratively shown as components that are controlled by a signal power estimation system 1.

Each constituent elements of system 1 may be connected to each other through communication network 40. For example, communication network 40 may refer to a connection structure that allows information exchange between individual nodes, such as terminals and servers. This includes local area network (LAN), wide area network (WAN), world wide web (WWW), wired and wireless data networks, telephone networks, and wired and wireless television networks. Examples of wireless data networks include 3G, 4G, 5G, 3GPP (3rd generation partnership project), long term evolution (LTE), world interoperability for microwave access (WiMAX), Wi-Fi, Bluetooth communication, infrared communication, ultrasonic communication, visible light communication (VLC), and LiFi. However, the embodiments are not limited thereto.

Dedicated EMS 20 may manage optical signal transmission power and optical signal reception power for transmission network equipment 10. EMS 20 is a network management software or system used in the telecommunications and network industry to monitor, configure, provision, and manage individual network elements or devices. These network elements can include various hardware devices such as routers, switches, servers, access points, and other network equipment. Key functions of EMS may include device management, configuration management, performance monitoring, fault detection and alarms, security and access control, provisioning, inventory management, reporting and analytics, and integrations.

Transmission network facility database (DB) 30 may be a computer system (e.g., database) that stores information on transmission network facilities including optical cable length, the number of patch sections (e.g., patch section count), the number of attenuators (e.g., attenuator count), and equipment type.

In accordance with an embodiment, signal power estimation apparatus 100 may collect transmission network facility information from dedicated EMS 20 and transmission network facility DB 30 and estimate and output an optimal optical signal transmission power for transmission network equipment 10 including the transmitter and the receiver.

Signal power estimation apparatus 100 may estimate optical signal reception power by inputting estimation data including an optical signal transmission power and transmission network facility information to a pre-trained model. The pre-trained model may be a deep learning-based regression model. In particular, the pre-trained model may be a regression model capable of estimating (e.g., predicting) optical signal reception power based on optical signal transmission power under specific environmental conditions. In other words, the pre-trained model may be a deep learning model with one or more hidden layers.

In accordance with an embodiment, the deep learning-based regression model (e.g., pre-trained model) may find optimal weights of a relation equation between an optimal optical signal transmission power and an optical signal reception power by performing deep learning with numerous data sets (e.g., optimal cable length, patch section count, attenuator count, equipment type) shown in Table 2 below.

Furthermore, signal power estimation apparatus 100 may estimate an optimal optical signal transmission power based on the estimated optical signal reception signal power and output the estimated optimal optical signal transmission power.

In accordance with an embodiment, signal power estimation apparatus 100 may output the optical signal transmission power inputted to the pre-trained model as an optimal optical signal transmission power in an event that the estimated optical signal reception power satisfies the predetermined value (e.g., predetermined conditions)

In addition, signal power estimation apparatus 100 may modify (e.g., compensate) the estimation data, apply the modified estimation data to the pre-trained model, and re-estimate optical signal reception power in an event that the estimated optical signal reception power does not satisfy the predetermined conditions.

In accordance with an embodiment, signal power estimation apparatus 100 may also generate train data sets and train the model for finding a relation equation between an optical signal transmission power and an optical signal reception power and the optimal weights thereof. Such a trained model may receive feature vectors and an optical signal transmission power and estimate optical signal reception power.

The train data set may include feature vectors and label value. The feature vectors may include at least one of an optical signal transmission power, an optical cable length, the number of patch sections, the number of attenuators, and equipment types. The label value may be an optical signal reception power or an optical signal transmission power. Signal power output apparatus 100 may train the model using the train data set.

In accordance with an embodiment, it is possible to prevent excessive optical signal power output from a transmitter considering environmental conditions.

Additionally, from a network intelligence perspective, processes that were challenging to manually handle due to numerous application target areas and equipment can be automated. Also, values that were hard to define with a rule-based approach may be calculated using an artificial intelligence-based method.

Figure 2:
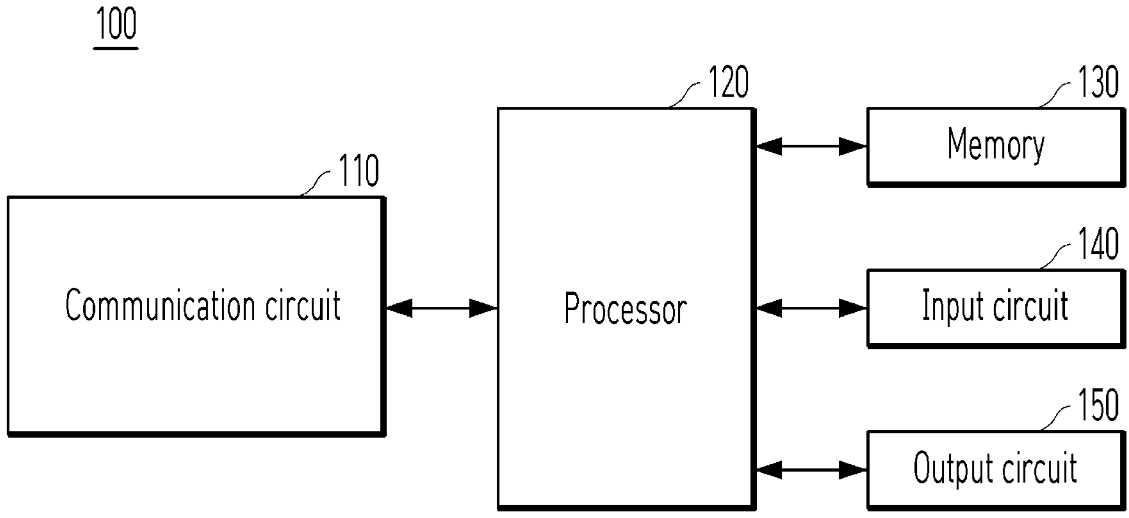
FIG. 2 is a diagram illustrating an apparatus for estimating an optimal optical signal transmission power in accordance with an embodiment.

FIG. 2 is a diagram illustrating a signal power estimation apparatus in accordance with an embodiment. Referring to FIG. 2, signal power estimation apparatus 100 may include communication circuit 110, processing circuit 120, memory 130, input/output circuit 140 in accordance with an embodiment. As described, signal power estimation apparatus 100 may be a computer system or a group of computers connected through a network, but the embodiments are not limited thereto.

Furthermore, FIG. 1 and FIG. 2 show signal power estimation apparatus 100 independent computer systems physically separated from EMS 20. However, the embodiments are not limited thereto. For example, signal power estimation apparatus 100 may be implemented as a physically or logically single system with EMS 20 in accordance with another embodiment.

Communication circuit 110 may include at least one circuitry module (or at least one circuit) for communicating with other entities, such as transmission network facility DB 30, EMS 20, transmitter 200, receiver 300, and transmission network equipment 10, through communication network 200. Communication network 200 may include a variety of communication networks such as a wireless communication network and a wired communication network, such as, a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network. Herein, the wireless communication circuit and wired communication may be separately or integrally configured.

Memory 130 may be connected to at least one processor 120 and stores a program containing instructions that execute configurations and/or methods described below. The program is implemented in conjunction with hardware such as memory and at least one processor to realize the embodiments of the present disclosure. Memory 130 may store a variety of information, such as software programs for operation, data received from other entities, and data generated as result of operations. That is, memory 130 may store operation system data, applications, and related data, received from other entities through a variety of communication media (e.g., communication networks). Memory 130 may include at least one of an internal memory and an external memory according to embodiments. For example, memory 130 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Input circuit 140 may be a user interface for receiving input from a user. For example, input circuit 140 may include any of a keypad, a dome switch, a touch pad, a jog wheel, and a jog switch, but is not limited thereto. Further, input circuit 140 may include several hardware key buttons. The hardware key buttons may include a hold key and a volume control button. Output circuit 150 may include a display panel and a circuit for controlling the display panel for visually outputting information processed by processing circuit 420. For example, display of output circuit 150 may be a liquid crystal display (LCD) panel, light emitting diode (LED) panel, organic light emitting diode (OLED) pane, or an active-matrix organic light-emitting diode (AMOLED) panel, but the present invention is not limited thereto.

Processor 120 may be a processing circuit or a set of processors for performing or controlling overall operation of signal power estimation apparatus 100. For example, processing circuit 120 may be a central processing circuitry that controls constituent elements (e.g., memory, communication circuit, input/output circuit, etc.) of signal power estimation apparatus 100 and/or performs a variety of operations (or functions) of signal power estimation apparatus 100 for estimating an optimal transmission power.

In accordance with an embodiment, processor 120 may include circuitry modules such as, i) an estimation circuitry module configured to estimate an optical signal reception power based on optical signal transmission power and transmission network facilities information, ii) a train data set generation circuitry module configured to generate train data sets for finding a relation equation of optical signal transmission power and optical signal reception power with optimal weights based on at least one of feature vectors and label value. and a learning circuitry module 170 configured to train a predetermined deep learning model using the train data sets.

In particular, processor 120 (e.g., estimation circuitry module) may i) generate estimation data by automatically generating an optical signal transmission power and collecting transmission network facilities information, ii) input the generated estimation data into a pre-trained model, and iii) estimate an optical signal reception power based on the generated estimation data including the automatically generated optical signal transmission power and collected transmission network facilities information.

The optical signal transmission power included in the estimation data may be selected from a predetermined range in accordance with an embodiment. For example, at an initial step, the estimated optical signal transmission power may be selected from a predetermined set of transmission powers, which may be automatically generated based on generated and accumulated train data sets. Since the operating environment varies for each equipment, it is difficult to determine the initial input optical signal transmission power. The initial input transmission power may be stored in memory 130 by an administrator, taking into consideration the environmental characteristics, and one value is automatically selected from the set of dBm values to be used in the model. For example, the initial input transmission power range is between −60 dBm to 30 dBm.

Here, the pre-trained model may be a deep learning-based regression model in accordance with an embodiment. In particular, the pre-trained model may be a regression model capable of estimating (e.g., predicting) optical signal reception power based on optical signal transmission power under specific environmental conditions. In other words, the pre-trained model may be a deep learning model with one or more hidden layers.

In accordance with an embodiment, the deep learning-based regression model (e.g., pre-trained model) may find optimal weights of a relation equation between an optimal optical signal transmission power and an optical signal reception power by performing deep learning with numerous data sets (e.g., optimal cable length, patch section count, attenuator count, equipment type) shown in Table 2. That is, since the pre-trained model already has the optimal weights of the relation equation, the pre-trained model may calculate an estimated optical signal reception power when variables, such as optical cable length, patch section count, attenuator count, equipment type, are input to the pre-trained model with the optical signal transmission power.

Processor 120 may determine whether the estimated optical signal reception power satisfies a predetermined condition or not. In accordance with an embodiment, when the estimated optical signal reception power satisfies a predetermined value (e.g., predetermined conditions), processor 120 may output the automatically generated optical signal transmission power as an optimal optical signal transmission power. That is, in this case, the estimated optical signal reception power may be optimal optical signal reception power corresponding to the automatically generated optical signal transmission power and the collected transmission network facilities information in accordance with an embodiment.

When the estimated optical signal reception power does not satisfy the predetermined condition, prediction circuit 110 may modify (or regenerate) the estimation data, input the modified estimation data to the pre-trained model, and estimate an optical signal reception power again. In particular, as modifying or regenerating the estimation data, processor 120 may decrease optical signal transmission power to be input to the pre-trained model by a predetermined value (e.g., predetermined amount).

In accordance with an embodiment, the predetermined condition may be a range of reference reception or transmission power (e.g., strength). For example, the reference power range may be between −27 dBm and −18 dBm. It may refer to as a recoverable signal strength range. In accordance with another embodiment, the predetermined condition may be a reference power, such as any value between −18 dBm to −27 dBm. For example, the predetermined value is about −27 dBm. For example, when the estimated optical signal reception power is greater than −27 dBm, it is determined that the predetermined condition satisfies. When the estimated optical signal reception power is smaller than −27 dBm, it is determined that the predetermined condition does not satisfy. However, the embodiments are not limited thereto. For example, about −18 dBm may be used as a reference value for determining whether the estimated optical signal reception power satisfies the predetermined condition or not.

As described, processor 120 may also generate a train data set and train the model with the generated train data set in accordance with an embodiment. For example, processor 120 may generate a train data set for estimating optical signal transmission power and optical signal reception power based on at least one of feature vectors and label value. The feature vectors may include optical signal transmission power, optical cable length, the number of patch sections, the number of attenuators, and equipment type.

For example, Table 1 below shows the feature vectors and the label value.

TABLE 1

| | Item | Data type | Description | Collected from |
|---|---|---|---|---|
| Feature vector | Optical signal transmission power | Real number | Optical signal power measured at a transmitter (dBm) | EMS |
| | Optical cable length | Real number | Length (km) of optical cable between a transmitter and a receiver including a female connector | Transmission network facility DB |
| | Number of patch sections | integer | Number of spliced segments in optical cable between a transmitter and receiver | |
| | Number of attenuators | Integer | Number of attenuators connected to a receiver | |
| | Equipment type | Integer | Label encoded value according to equipment type | |
| Label value | Optical signal reception power | Real number | Optical signal power measured at a receiver (dBm) | EMS |

As shown in Table 1, the feature vectors may include optical signal transmission power, optical cable length, the number of patch sections, the number of attenuators, and equipment type. The optical signal transmission power may be measured in dBm at a transmitter, a data type thereof may be a real number, and it is collected by EMS 20. The optical cable length is a length (km) of an optical cable between a transmitter and a receiver, including female connectors, a data type thereof may be a real number, and it is collected from transmission network facility DB 30. The number of patch sections is the number of spliced sections in an optical cable between a transmitter and a receiver, the data type thereof may be integer, and it is collected by transmission network facility DB 30. The number of attenuators is the number of attenuators connected to a receiver, a data type thereof may be integer, and it is collected by transmission network facility DB 30. The equipment type is a value encoded based on the equipment type, a data type thereof may be integer, and it is collected by transmission network facility DB 30.

The label value may represent either optical signal reception power or optical signal transmission power. For example, the optical signal reception power included in the label value may be measured at a receiver in dBm, a data type thereof may be a real number, and it may be collected by EMS 20. Table 1 shows that the optical signal transmission power is included only in the feature vector. However, the embodiments are not limited thereto. For example, the optical signal transmission power may be included in the label value in accordance with another embodiment. As described, processor 120 may generate a train data set for estimating optical signal transmission power and optical signal reception power based on at least one of feature vectors and label value. Table 2 below shows the generated train data set.

Learning circuit 170 may train the model using the train data set, as shown in Table 2.

TABLE 2

| | Feature vector | | | | | Label |
|---|---|---|---|---|---|---|
| Train Data Set # | Tx power | Cable length | Number of patch sections | Number of attenuators | Equip-ment type | value Rx power |
| 1 | 17.3 | 69.4 | 1 | 0 | 0 | −5.5 |
| 2 | 17.0 | 83 | 3 | 0 | 0 | −9.4 |

Processor 120 may train the model using the train data set, as shown in Table 2. For example, the generated train data set #1 may include a feature vector with optical signal transmission power of 17.3, optical cable length of 69.4, patch section count of 1, attenuator count of 0, and equipment type of 0. Further the generated train data set #1 may further include optical signal reception power of −5.5. Similarly, the generated train data set #2 may include a feature vector with optical signal transmission power of 17.0, optical cable length of 83, patch section count of 3, attenuator count of 0, and equipment type of 0. The generated train data set #2 may also include a label value with optical signal reception power of −9.4.

In accordance with an embodiment, a main optical cable may be divided into multiple sub-optical cables depending on multiple patch sections connecting to the main optical cable. Processor 120 may generate train data sets for each of these multiple sub-optical cables using materials and lengths associated with them.

Processor 120 may train the model using the generated train data sets to estimate relation between optical signal transmission power and optical signal reception power in accordance with an embodiment. In particular, processor 120 may configure the model to input optical signal transmission power with feature vectors according to purpose and to output an optical signal reception power as a label value. Also, processor 120 may configure the model to input optical signal reception power at feature vectors according to purpose and to output an optical signal transmission power as label value. That is, the deep learning-based regression model (e.g., pre-trained model) may find optimal weights of a relation equation between an optimal optical signal transmission power and an optical signal reception power by performing deep learning (e.g., being trained) with numerous data sets (e.g., optimal cable length, patch section count, attenuator count, equipment type) shown in Table 2. By training the model in this way, considering complex factors that influence the natural attenuation of optical signal strength, such as optical cable length, patch section count, attenuator count, and equipment type, processor 120 may be able to predict based on the relationship between optical signal transmission power and optical signal reception power.

Figure 3:
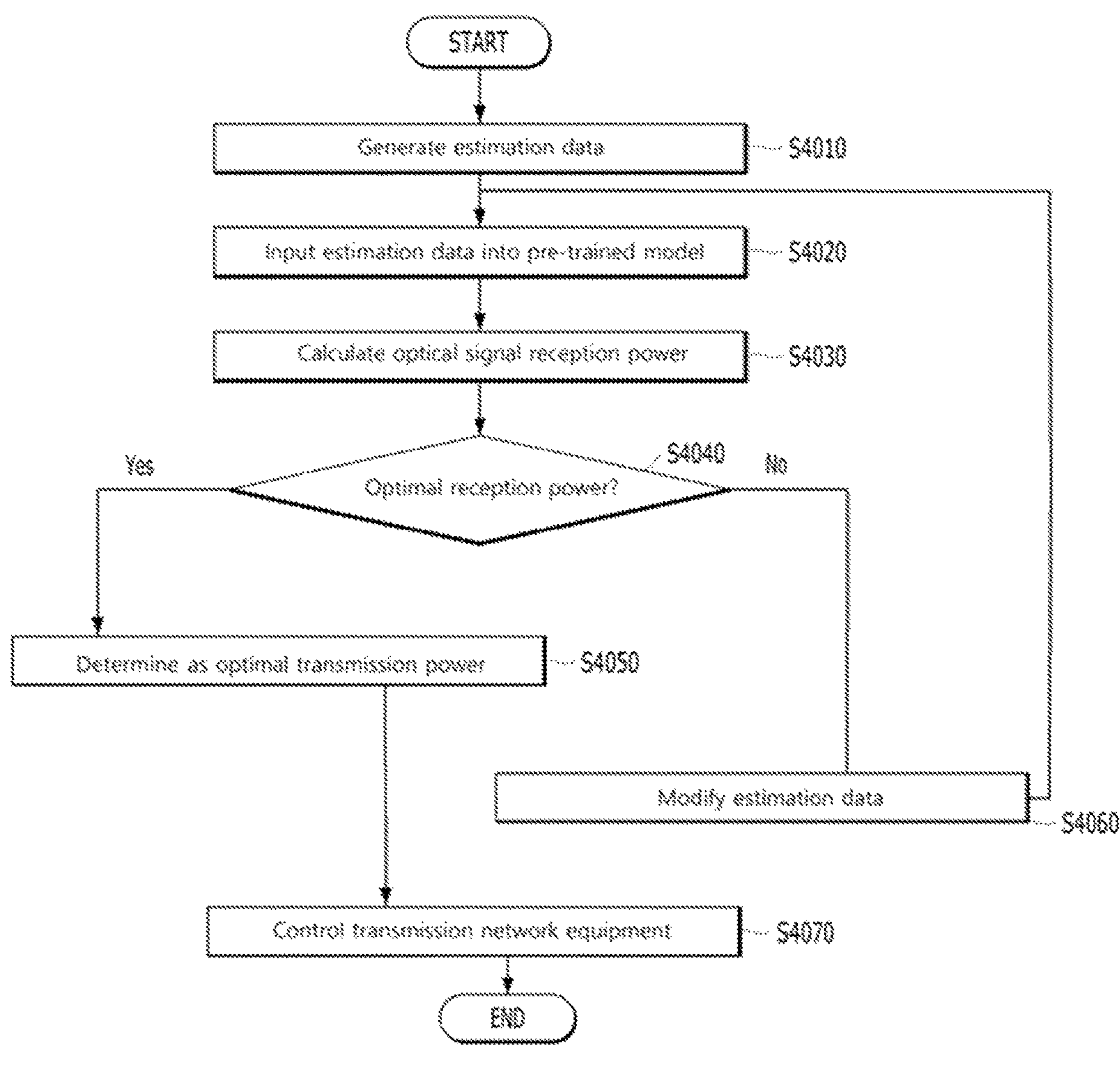
FIG. 3 is a flowchart illustrating a method for estimating an optimal optical signal transmission power for transmission network equipment in accordance with an embodiment.

FIG. 3 is a flowchart illustrating a method for estimating an optimal optical signal transmission power and controlling an optical signal transmission power based on the estimated optimal optical signal transmission power in accordance with an embodiment. Referring to FIG. 3, estimation data may be generated at step S3010. For example, the estimation data may include estimated optical signal transmission power and collected transmission network facility information. At an initial step, the estimated optical signal transmission power may be selected from a predetermined set of transmission powers, which may be automatically generated based on generated and accumulated train data sets.

Since the operating environment varies for each equipment, it is difficult to determine the initial input optical signal transmission power. The initial input transmission power may be stored in memory 130 by an administrator, taking into consideration the environmental characteristics, and one value is automatically selected from the set of dBm values to be used in the model. For example, the initial input transmission power range is between −60 dBm to 30 dBm.

When the selected optical signal transmission power is not an optimal value, the next estimated optical signal transmission power may be generated by decreasing or increasing the initial optical signal transmission power by a predetermined value or amount.

Further, the transmission network facility information may be collected from transmission network facility DB 30. For example, the collected transmission network facility information may include optical signal transmission power, optical cable length, the number of patch sections, the number of attenuators, and equipment type.

At step S3020, the generated estimation data may input a pre-trained model. For example, the pre-trained model may be a deep learning-based regression model in accordance with an embodiment. In particular, the pre-trained model may be a regression model capable of estimating (e.g., predicting) optical signal reception power based on optical signal transmission power under specific environmental conditions. In other words, the pre-trained model may be a deep learning model with one or more hidden layers.

In accordance with an embodiment, the deep learning-based regression model (e.g., pre-trained model) may find optimal weights of a relation equation between an optimal optical signal transmission power and an optical signal reception power by performing deep learning with numerous data sets (e.g., optimal cable length, patch section count, attenuator count, equipment type) shown in Table 2. That is, since the pre-trained model already has the optimal weights of the relation equation, the pre-trained model may calculate an estimated optical signal reception power when variables, such as optical cable length, patch section count, attenuator count, equipment type, are input to the pre-trained model with the optical signal transmission power.

At step S3030, the estimated optical signal reception power may be generated. The pre-trained model may generate the estimated optical signal reception power using the predetermined relation equation with the optima weights between the optical signal reception power and the optical signal transmission power with the transmission network facility information (e.g., network environment factors, feature vectors: optical cable length, patch section count, attenuator count, equipment type). As described, such a relation equipment with the optimal weights may be generated by generating numerous train data sets (shown in Table 2) and training the deep learning model with the generated train data sets to calculate estimated optical signal transmission/reception powers based on the generated numerous train data sets.

At step S3040, determination may be made whether the estimated optical signal reception power satisfies a predetermined condition. In accordance with an embodiment, estimation apparatus 100 may determine whether the estimated optical signal reception power satisfies a predetermined condition, for example, whether the estimated optical signal reception power is included within a predetermined range, or smaller than a predetermined value, or greater than a predetermined value.

In accordance with an embodiment, the predetermined condition may be a range of reference reception or transmission power (e.g., strength). For example, the reference power range may be between −27 dBm and −18 dBm. It may refer to as a recoverable signal strength range. In accordance with another embodiment, the predetermined condition may be a reference power, such as any value between −18 dBm to −27 dBm. For example, the predetermined value is about −27 dBm. For example, when the estimated optical signal reception power is greater than −27 dBm, it is determined that the predetermined condition satisfies. When the estimated optical signal reception power is smaller than −27 dBm, it is determined that the predetermined condition does not satisfy. However, the embodiments are not limited thereto. For example, about −18 dBm may be used as a reference value for determining whether the estimated optical signal reception power satisfies the predetermined condition or not.

When the predetermined condition does not satisfy (No—S3040), the estimation data may be modified at step S4060. In accordance with an embodiment, the generated optical signal transmission power in the estimation data may be modified by decreasing or increasing it with a predetermined value. Then, the modified estimation data may be input again to the trained model for calculating the optical signal reception power at step S4020.

When the predetermined condition satisfies (Yes—S3040), the generated optical signal transmission power included in the estimation data may be determined as an optimal optical signal transmission power at step S4050. That is, since the optimal (e.g., acceptable) optical signal reception power is output from the trained model, the generated optical signal transmission power is determined as an optimal optical signal transmission power.

At step S4070, the optical signal transmission network equipment may be controlled based on the determined optimal optical signal transmission power. For example, a transmitter may be controlled to generate an optical signal with the determined optimal optical signal transmission power. Such an operation may be performed by EMS 20. However, the embodiments are not limited thereto. Such controlling operations may be performed through various operations.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present disclosure can be embodied in the form of methods and apparatuses for practicing those methods. The present disclosure can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present disclosure can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present disclosure can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for estimating and controlling optical signal transmission power for transmission network equipment, comprising a memory configured to store transmission network facility information including at least optical cable length, number of patch sections, number of attenuators, and equipment type;

a communication circuit configured to communicate with at least one transmission network equipment and an element management system (EMS); and a processor configured to:

generate estimation data including an estimated optical signal transmission power and the transmission network facility information;

input the estimation data into a pre-trained deep learning regression model to calculate an optical signal reception power;

determine an optimal optical signal transmission power based on whether the calculated optical signal reception power satisfies a predetermined reception power condition; and control, via the communication circuit, a transmitter of the transmission network equipment to output an optical signal having the determined optimal optical signal transmission power.

2. The apparatus of claim 1, wherein the processor determines the estimated optical signal transmission power as the optimal optical signal transmission power in an event that the calculated optical signal reception power satisfies a predetermined value.

3. The apparatus of claim 1, wherein the processor modifies the estimation data in an event that the calculated optical signal reception power does not satisfy the predetermined value, inputs the modified estimation data into the pre-trained deep learning regression model, and recalculate an optical signal reception power, for controlling the transmitter of the transmission network equipment.

4. The apparatus of claim 1, wherein the pre-trained deep learning regression model is a deep learning model with one or more hidden layers.

5. The apparatus of claim 1, wherein the processor:

generate at least one train data set for optical signal transmission power and optical signal reception power based on at least one feature value and label value; and training the pre-trained deep learning regression model using the generated at least one train data set.

6. The apparatus of claim 5, wherein the feature vectors include optical signal transmission power, optical cable length, number of patch sections, number of attenuators, and equipment type.

7. The apparatus of claim 5, wherein the label value includes optical signal reception power and optical signal transmission power.

8. A method of estimating and controlling an optical signal transmission power and transmission network facility information, the method comprising:

generating estimation data including an estimated optical signal transmission power and transmission network facility information;

inputting the estimation data into a pre-trained deep learning regression model;

calculating an estimated optical signal reception power based on the estimation data;

determining an optimal optical signal transmission power based on whether the calculated optical signal reception power satisfies a predetermined reception power condition; and controlling a transmitter of the transmission network equipment to transmit an optical signal at the determined optimal optical signal transmission power.

9. The method of claim 8, further comprising: determining the estimated optical signal transmission power as the optimal optical signal transmission power in an event that the calculated optical signal reception power satisfies a predetermined value.

10. The method of claim 8, further comprising:

modifying the estimation data in an event that the calculated optical signal reception power does not satisfy the predetermined value;

inputting the modified estimation data into the pre-trained deep learning regression model; and recalculating an optical signal reception power, for controlling the transmitter of the transmission network equipment.

11. The method of claim 8, wherein the pre-trained deep learning regression model is a deep learning model with one or more hidden layers.

12. The method of claim 8, further comprising:

generating at least one train data set for optical signal transmission power and optical signal reception power based on at least one feature value and label value; and training the pre-trained deep learning regression model using the generated at least one train data set.

13. The method of claim 12, wherein the feature vectors include optical signal transmission power, optical cable length, number of patch sections, number of attenuators, and equipment type.

14. The method of claim 12, wherein the label value includes optical signal reception power and optical signal transmission power.

15. A non-transitory computer-readable medium storing computer-readable instructions such that, when executed by a processor, cause the processor to perform a method of estimating and controlling an optimal optical signal transmission power for transmission network equipment, the method comprising:

generating estimation data including an estimated optical signal transmission power and transmission network facility information;

inputting the estimation data into a pre-trained deep learning regression model;

calculating an estimated optical signal reception power based on whether the calculated optical signal reception power satisfies a predetermined reception power condition; and controlling a transmitter of the transmission network equipment to output an optical signal at the determined optimal optical signal transmission power.

* * * * *